United States Patent [19]

Yamada

[11] Patent Number: 4,687,299

[45] Date of Patent: Aug. 18, 1987

[54] ELECTRODE STRUCTURE OF DOT-MATRIX LIQUID-CRYSTAL CELL HAVING CORRESPONDING NOTCHES AND SLITS

[75] Inventor: Osamu Yamada, Tokorozwa, Japan

[73] Assignee: Citizen Watch Co., Ltd., Tokyo, Japan

[21] Appl. No.: 874,722

[22] Filed: Jun. 16, 1986

[30] Foreign Application Priority Data

Jun. 18, 1985 [JP] Japan ................... 60-132573

[51] Int. Cl.$^4$ ................................ G02F 1/13
[52] U.S. Cl. ........................ 350/336; 350/333
[58] Field of Search ................... 350/333, 336

[56] References Cited

U.S. PATENT DOCUMENTS 4,624,530 11/1986 Takahara et al. .............. 350/336

FOREIGN PATENT DOCUMENTS

60-175029 9/1985 Japan ....................... 350/336

*Primary Examiner*—John K. Corbin
*Assistant Examiner*—Richard F. Gallivan
*Attorney, Agent, or Firm*—Townsend and Townsend

[57] ABSTRACT

In a liquid-crystal cell, a group of parallel signal electrodes are arranged on a first transparent substrate to be separated from each other at central portions in the longitudinal direction thereof, and a group of parallel scanning electrodes are arranged on a second transparent substrate to be substantially perpendicular to the signal electrodes. The first and second transparent substrates are adhered to each other to sandwich a liquid-crystal material therebetween. A slit is formed in each signal electrode along the widthwise direction thereof at a non-intersecting portion between the signal and scanning electrodes. In addition, notches are formed along two side edges of each scanning electrode at equal intervals. The length of a projection defined by two adjacent notches is smaller than that of the slit.

5 Claims, 16 Drawing Figures

ELECTRODE STRUCTURE OF DOT-MATRIX LIQUID-CRYSTAL CELL HAVING CORRESPONDING NOTCHES AND SLITS

BACKGROUND OF THE INVENTION

1. Field of the Invention

The present invention relates to a liquid-crystal cell and, more particularly, to an electrode structure of electrodes arranged in a liquid-crystal cell.

In recent years, liquid-crystal display elements have been widely applied to display apparatuses. In particular, a matirx liquid-crystal display element is applied to, e.g., a television for displaying moving images. In a so-called X-Y matrix liquid-crystal element, a large number of transparent stripe electrodes are respectively aligned on two glass substrates, and these glass substrates are arranged so that their transparent stripe electrodes are perpendicular to each other. A liquid-crystal material is sealed between the two substrates. One group of transparent electrodes serves as scanning electrodes (X electrodes), and the other group of transparent electrodes serves as signal electrodes (Y electrodes). When a scanning signal is sequentially applied to the scanning electrodes at given intervals and an image signal to be displayed is applied to the signal electrodes, an image is displayed by pixels corresponding to intersections between both the electrodes.

Figure 1:
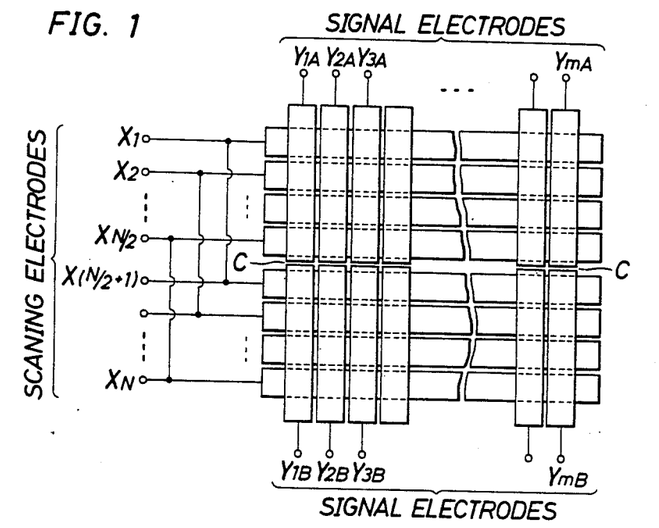
FIG. 1 is a plan view of the electrode arrangement of a conventional X-Y matrix liquid-crystal cell.

In a method of driving the X-Y matrix liquid-crystal display element, m signal electrodes are vertically divided into two groups by a central portion C of the element, as shown in FIG. 1. Upper half scanning electrodes $X_1, X_2, \ldots, X_{N/2}$ of n scanning electrodes are combined with upper half signal electrodes $Y_{1A}, Y_{2A}, \ldots, Y_{mA}$, and remaining (lower) half scanning electrodes $X_{N2}, X_{(N/2+1)}, \ldots, X_N$ are combined with lower half signal electrodes $Y_{1B}, Y_{2B}, \ldots, Y_{mB}$. The two combinations of the electrodes can be driven as if they were independent X-Y matrix liquid-crystal display elements. This method has been disclosed in Japanese Patent Disclosure No. 59-186985 and in U.S. Pat. No. 4,541,690. With this drive method, a high contrast ratio and a high response speed can be expected.

Figure 2:
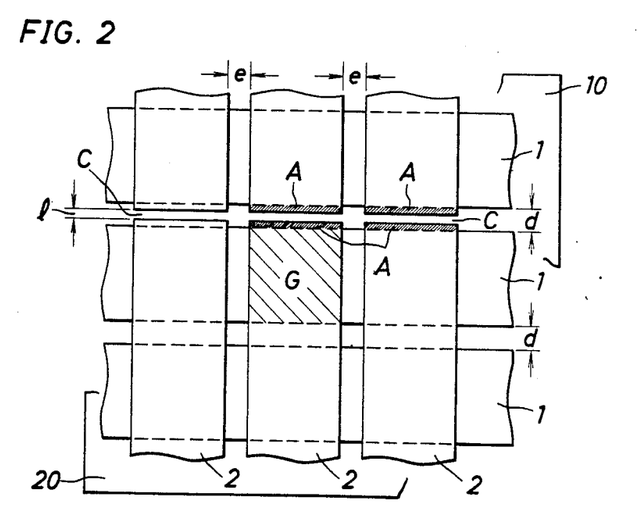
FIG. 2 is a partially enlarged view of the electrode arrangement shown in FIG. 1.

FIG. 2 shows an enlarged electrode structure of the X-Y matrix liquid-crystal cell driven by the above method. Scanning electrodes 1 are aligned on a glass substrate 10 in the form of strips to be vertically separated from each other by a distance d, and signal electrodes 2 are aligned on a glass substrate 20 in the form of strips to be horizontally separated from each other by a distance e and to be separated by a distance l from the opposing signal electrodes at a central portion C in the longitudinal direction thereof. Since the intersection between the scanning and signal electrodes 1 and 2 (indicated by coarse hatching) serves as a pixel G, the distance l is selected to be smaller than the distance d so as not to influence a displayed image.

Figure 3:
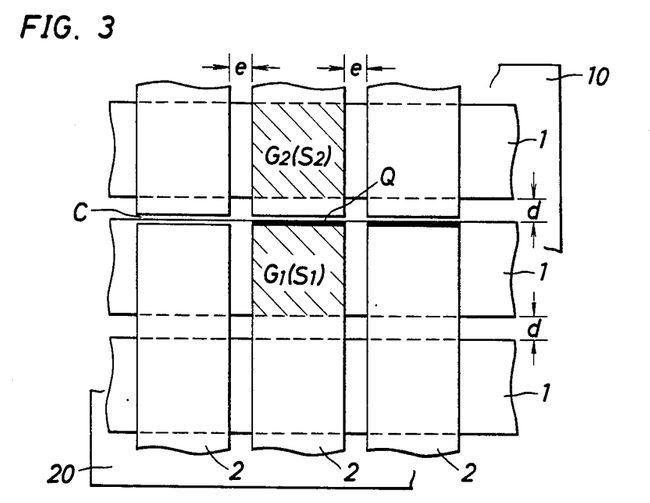
FIG. 3 is a partially enlarged view showing a state wherein the electrodes shown in FIG. 2 are shifted.

In terms of mass-production, the distances d, e, and l for the electrodes 1 and 2 fall within the range of at most 10 to 20 μm due to limitations in the manufacture thereof (e.g., a print technique), and it is impossible to make the distance l smaller than the distance d by any great degree. As a result, in the manufacture of the liquid-crystal cell, when the glass substrate 20 on which the signal electrodes are formed and the glass substrate 10 on which the scanning electrodes are formed are adhered by a sealing agent, if the relative positions of both the substrates are shifted, an area $S_1$ of a pixel $G_1$ becomes smaller than an area $S_2$ of a pixel $G_2$ by a solid area Q under the influence of the central portion C of the signal electrodes 2, as shown in FIG. 3. For this reason, when the liquid-crystal cell is driven by applying a voltage to the electrodes 1 and 2, a non-illuminated portion of the central portion becomes wider than that of other portions, and a white line is undesirably displayed on the central portion of a screen, resulting in poor display. More specifically, referring to FIG. 2, if the distance l is set to be 10 μm and the distance d is set to be 20 μm, distal ends A (indicated by fine hatching) of the signal electrodes 2 at the central portion C are respectively 5 μm. When the shifting between the glass substrates exceeds 5 μm, the area $S_1$ of the pixel $G_1$ begins to decrease, and a white line appears along the central portion C of the signal electrodes 2 (i.e., at the central portion of the screen). Therefore, a tolerance for shifting between the two glass substrates is ±5 μm. FIG. 3 shows a case wherein the glass substrate 20 with the signal electrodes 2 shifts downward with respect to the glass substrate 10 mounting the scanning electrodes 1. Conversely, if they shift upward, the same phenomenon as above occurs.

In the steps in the manufacture of the conventional liquid-crystal cells, in order to keep a relative positional precision between the two glass substrates, assembly is performed while the shifting of the relative positions is corrected several times before the sealing agent for adhering the substrates is hardened. For this reason, this undesirably increases the number of assembly steps and, in spite of this, it is still difficult to yield a perfect product. In addition, the manufacturing cost is thereby increased, resulting in expensive products. In the manufacture of the liquid-crystal cells, transparent electrode patterns for a plurality of liquid-crystal cells are printed respectively on two glass substrates at the same time, and after the two glass substrates are aligned and adhered to each other through a sealing agent attached around the respective electrode patterns, the resultant structure is cut into individual cells. In this case, display quality is often degraded by shifting of photomasks for forming electrode patterns, shifting of patterning (e.g., printing or exposure), and shifting of the two glass substrates when they are adhered to each other. Therefore, it is difficult to decrease product cost.

SUMMARY OF THE INVENTION

It is an object of the present invention to provide a liquid-crystal cell which is free from a horizontal white line appearing at the center of a screen and, more specifically, to provide a liquid-crystal cell which allows easy alignment of two glass substrates by changing the shapes of transparent electrodes.

DETAILED DESCRIPTION OF THE PREFERRED EMBODIMENTS

An embodiment of the present invention will now be described with reference to the accompanying drawings.

Figure 4A:
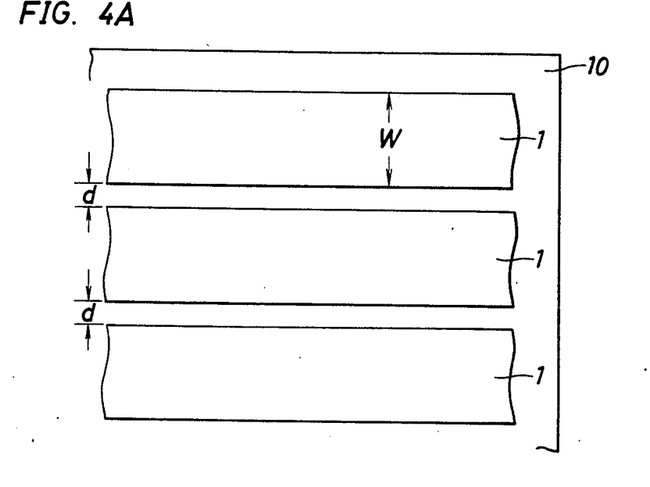
FIG. 4A is a partially enlarged view of the scanning electrodes of a liquid-crystal cell according to a first embodiment of the present invention.
Figure 4B:
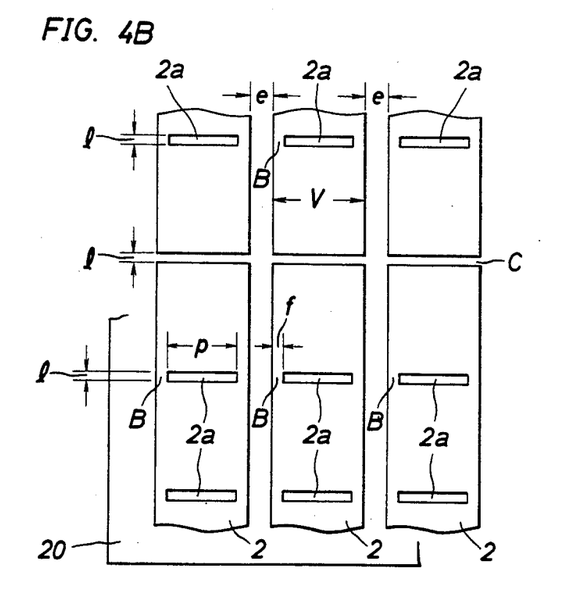
FIG. 4B is a partially enlarged view of the signal electrodes of the liquid-crystal cell according to the first embodiment of the present invention.

FIGS. 4A and 4B show the electrode shapes of the liquid-crystal cell according to a first embodiment of the present invention. As shown in FIG. 4A, scanning electrodes 1 are the same transparent stripe electrodes as the conventional scanning electrodes formed on a glass substrate 10. As shown in FIG. 4B, signal electrodes 2 are formed on a glass substrate 20, and slits 2a of a length p and a width l are formed in each signal electrode 2 along the widthwise direction thereof, at non-intersecting portions between the scanning and signal electrodes 1 and 2. Each signal electrode 2 is vertically connected by connecting portions (two end electrode connecting portions) B of a width f at two ends of each slit 2a.

The sizes of the respective portions of the electrodes are as follows: a distance d between adjacent scanning electrodes 1 is 20 μm; a width W of each scanning electrode 1 is 500 μm; a distance e between adjacent signal electrodes 2 is 20 μm; a width V of each signal electrode 2 is 400 μm; a distance l of a central portion C of the signal electrodes 2 is 10 μm; the width f of the two end electrode connecting portions B is 30 μm; and the width l of the slits 2a is 10 μm. It should be noted that the sizes of the respective portions in the drawings are different from actual sizes for the sake of easy understanding of the present invention.

Figure 5:
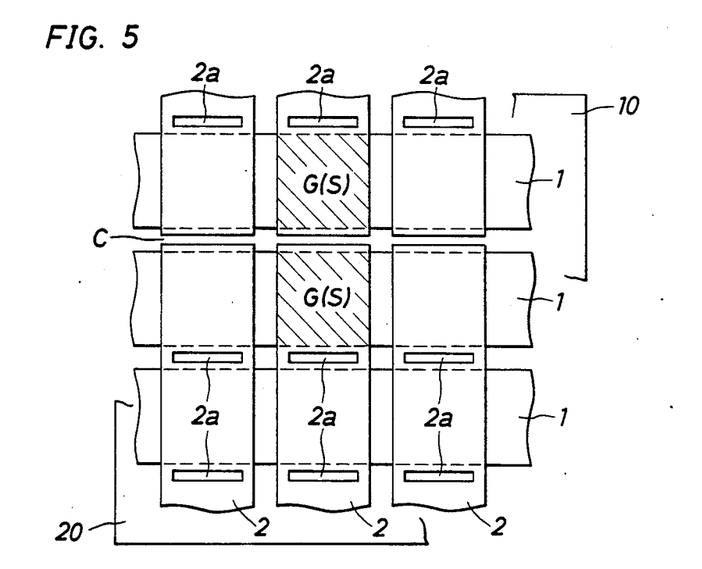
FIG. 5 is a partially enlarged view showing the electrode arrangement combining the scanning electrodes shown in FIG. 4A and the signal electrodes shown in FIG. 4B.

FIG. 5 shows a state wherein the scanning and signal electrodes 1 and 2 are arranged to be shifted neither in the vertical nor horizontal directions. In this state, intersections (indicated by hatching) between the electrodes 1 and 2 serve as pixels G, and areas S of all the pixels G are equal to each other.

Next, another case will be considered wherein the scanning and signal electrodes 1 and 2 are shifted vertically (indicated by the white arrow in FIG. 6) from each other in the manufacture of the liquid-crystal cell. An area $S_1$ of a pixel $G_1$ is decreased by an area Q (indicated by solid bars), and an area $S_2$ of a pixel $G_2$ is decreased by an area Q' (indicated by solid bars). When the decreased area Q of the pixel $G_1$ is compared with the decreased area Q' of the pixel $G_2$, the area Q' is smaller than the area Q by the sum of areas of the two electrode connecting portions B of the slit 2a. In other words, the area $S_2$ of the pixel $G_2$ becomes larger than the area $S_1$ of the pixel $G_1$ by the sum of the areas of the two end electrode connecting portions B of the slit 2a. Strictly speaking, a white line faintly appears along the central portion C of the signal electrodes 2. In the conventional electrode arrangement shown in FIG. 3, the difference between the area $S_1$ of the pixel $G_1$ and the area $S_2$ of the pixel $G_2$ is Q, while the difference between the areas $S_1$ and $S_2$ is $Q-Q'$ in the embodiment shown in FIG. 6. Since the difference $Q-Q'$ is a very small value, the areas $S_1$ and $S_2$ of the pixels $G_1$ and $G_2$ are substantially equal to each other. Therefore, in this embodiment, the white line appearing at the center of the screen is negligible when compared with that of the conventional electrode arrangement.

Figure 6:
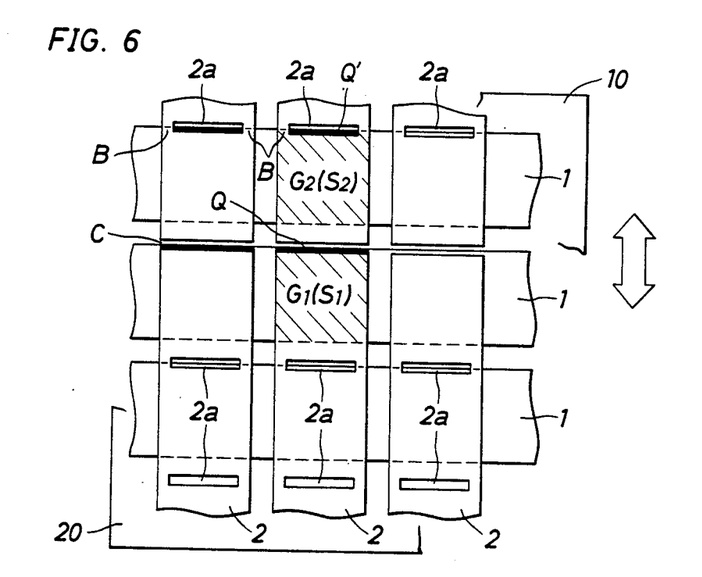
FIG. 6 is a partially enlarged view showing a state wherein one electrode group is shifted vertically from the other electrode group in the electrode arrangement shown in FIG. 5.

In this embodiment, since the distance d between adjacent scanning electrodes 2 is 20 μm and the width l of the slits 2a of the signal electrodes 2 and the distance l of the central portion C of the signal electrodes 2 are respectively 10 μm, a tolerance for vertical shifting of the substrates is ±15 μm. Since the tolerance in the conventional electrode arrangement is ±5 μm, the tolerance for shifting of the glass substrates 10 and 20 in this embodiment is extended by 10 μm, from ±5 μm to ±15 μm.

Figure 7A:
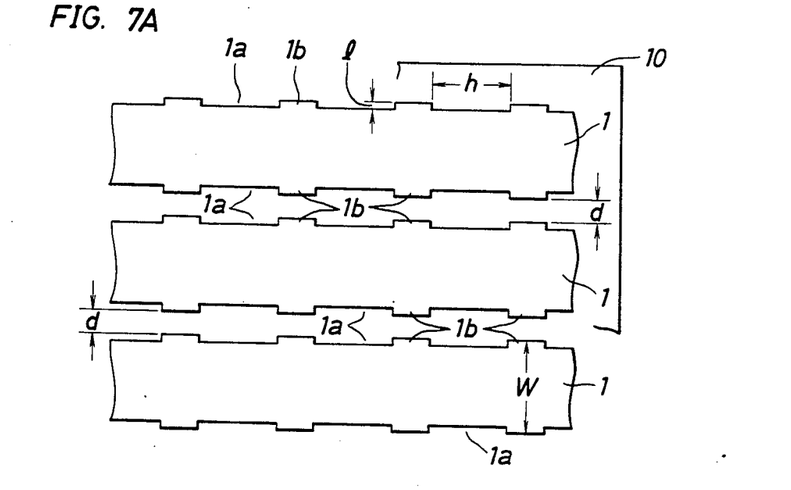
FIG. 7A is a partially enlarged view of the scanning electrodes of a liquid-crystal cell according to a second embodiment of the present invention.
Figure 7B:
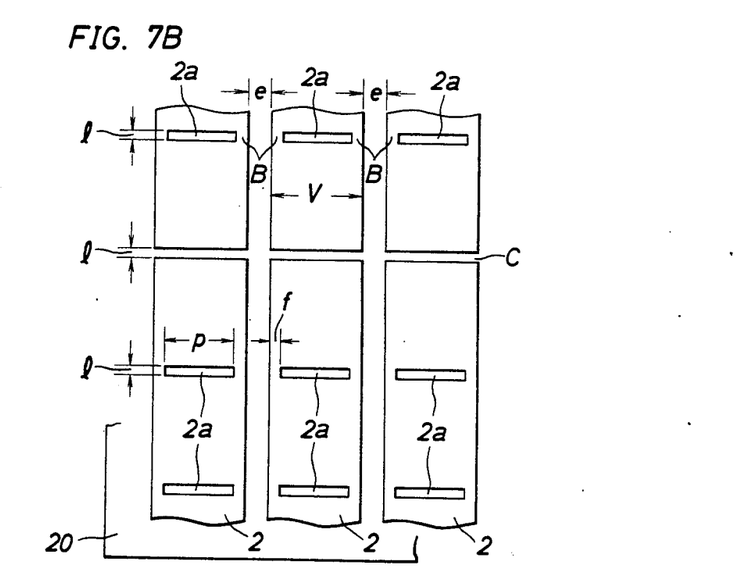
FIG. 7B is a partially enlarged view of the signal electrodes of the liquid-crystal cell according to the second embodiment of the present invention.

FIGS. 7A and 7B show the electrode shapes of a liquid-crystal cell according to a second embodiment of the present invention. This embodiment is free from the adverse influence caused by the two end electrode connecting portions of the slits formed in each signal electrode in the first embodiment.

Although signal electrodes 2 shown in FIG. 7B are the same as those in FIG. 4B, scanning electrodes 1 shown in FIG. 7A are different from those in the first embodiment.

More specifically, notches 1a of a length h and a depth l are formed along the two edges of each scanning electrode 1 at equal intervals, thereby forming projections 1b at positions corresponding to slits 2a of the signal electrodes 2. The depth of the notches 1a is equal to the width of the slits 2a of the signal electrodes 2 and the inter-electrode distance l at the central portion C of the signal electrodes 2 (e.g., 10 μm).

Figure 8:
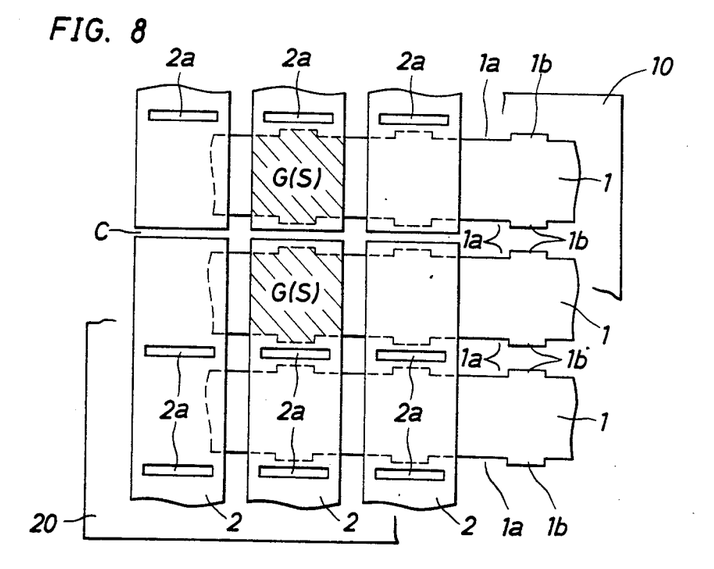
FIG. 8 is a partially enlarged view of the electrode arrangement combining the scanning electrodes shown in FIG. 7A and the signal electrodes shown in FIG. 7B.

FIG. 8 illustrates a state wherein the scanning and signal electrodes 1 and 2 are arranged to be shifted neither in the vertical nor horizontal directions. In this state, intersections (indicated by hatching) between the electrodes 1 and 2 serve as pixels G, and areas S of all the pixels G are equal to each other.

Figure 9:
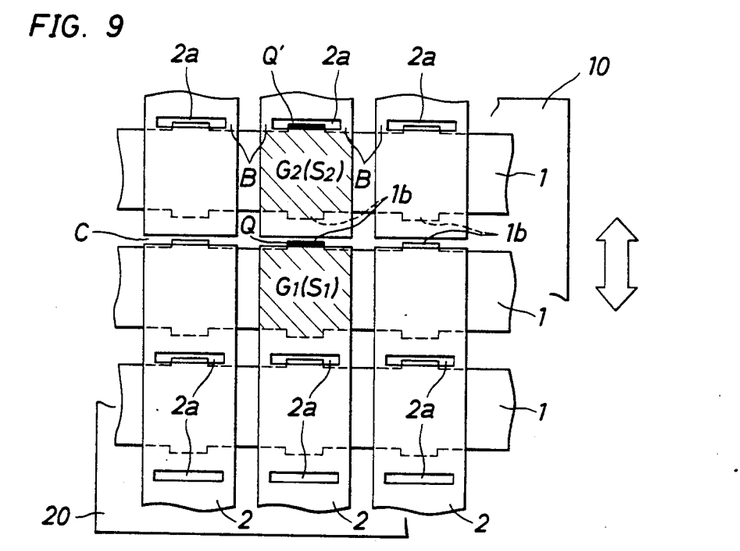
FIG. 9 is a partially enlarged view showing a state wherein one electrode group is shifted vertically from the other electrode group in the electrode arrangement shown in FIG. 8.

Next, a case will be considered wherein the scanning and signal electrodes 1 and 2 are shifted vertically (indicated by the white arrow) from each other, as shown in FIG. 9, in the manufacture of the liquid-crystal cell of this embodiment. An area $S_1$ of a pixel $G_1$ is decreased by an area Q (indicated by solid bars) before it is influenced by the central portion C, and an area $S_2$ of a pixel $G_2$ is decreased by an area Q' (indicated by solid bars) due to the presence of the slits 2a. However, in this embodiment, as can be seen from FIG. 9, the decreased area Q of the pixel $G_1$ is equal to the decreased area Q' of the pixel $G_2$.

As shown in FIG. 7, since the notches 1a are formed in the scanning electrodes 1, two end electrode connecting portions B of each slit 2a correspond to non-intersecting portions, and the decreased areas of the pixels $G_1$ and $G_2$ are determined only by the projections 1b formed in the scanning electrodes 1. Therefore, even when the glass substrates 10 and 20 are vertically shifted from each other, if the amount of shifting falls within the width of the slit 2a, the areas $S_1$ and $S_2$ of the pixels $G_1$ and $G_2$ always become equal to each other. Thus, a white line will not appear at the center of the screen.

The second embodiment is superior to the first embodiment since the white line appearing at the center of the screen can be completely prevented within the range of shifting tolerance of ±15 μm for vertical shifting of the glass substrates. However, even in the second embodiment, when the amount of shifting exceeds a certain value with respect to horizontal shifting of the glass substrates, an adverse influence appears. This will be explained with reference to FIG. 10.

Figure 10:
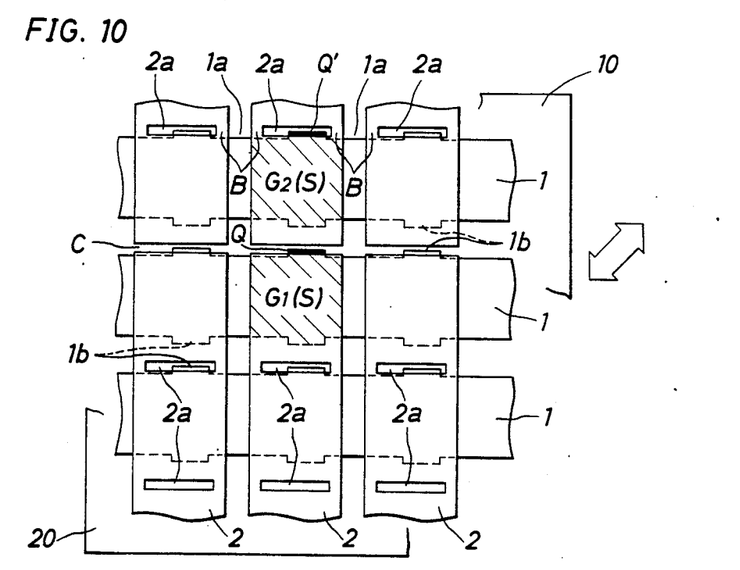
FIG. 10 is a partially enlarged view showing a state wherein one electrode group is shifted obliquely from the other electrode group in the electrode arrangement shown in FIG. 8.

In FIG. 10, the projections 1b of the scanning electrodes 1 are shifted to the right compared with those in FIG. 9. Since the projections 1b are located within the slits 2a of the signal electrodes 2, the decreased areas of the pixels $G_1$ and $G_2$ are equal to each other, as in FIG. 9. Therefore, no white line appears at the center of the screen.

However, when the amount of horizontal shifting of the glass substrates 10 and 20 increases further, the projections 1b of the scanning electrodes 1 fall partially outside the slits 2a of the signal electrodes 2, and the area $S_2$ of the pixel $G_2$ becomes smaller than the area Q by an area corresponding to this portion. More specifically, since the portion of the projection 1b falling outside the slit 2a forms intersections with the two end connecting portions B of the signal electrode 2, the area $S_2$ of the pixel $G_2$ becomes larger than the area $S_1$ of the pixel $G_1$ by an area corresponding to this intersection, and a white line appears at the center of the screen due to the difference between the areas. Therefore, a tolerance for horizontal shifting of the glass substrates 10 and 20 is determined by the relationship between tthe lengths of the slit 2a of the signal electrode 2 and the projection 1b of the scanning electrode 1. If the tolerance for the horizontal shifting of the glass substrates 10 and 20 is given by g, the length h of the notch 1a of the scanning electrode can be obtained by the following equation:

$$h = e + 2f + 2g$$

where e and f are, respectively, a distance between adjacent signal electrodes 2, and a distance between the side edge of the signal electrode 2 and the end portion of the slit 2a (i.e., the distance of the electrode connecting portion B). Assuming that the tolerance g of the horizontal shifting of the glass substrates is set to be equal to that of the vertical shifting, i.e., ±15 μm, the length h of the notch 1a of the scanning electrode 1 is given by:

$$h = 20 + 2 \times 30 + 2 \times 15 = 110 \; \mu m$$

The tolerance g for the horizontal shifting of the glass substrates 10 and 20 increases as the length of the projection 1b of the scanning electrode 1 decreases. However, if the length of the projection 1b decreases, the areas $S_1$ and $S_2$ of the pixels $G_1$ and $G_2$ in the correct electrode alignment state become smaller than those in the first embodiment, a contrast is reduced accordingly and image quality is degraded. Therefore, the projection 1b is preferably formed as long as possible. In view of this, the length of the projection 1b, i.e., that of the notch 1a, is determined by taking both the tolerance for the horizontal shifting of the glass substrates and the areas of the pixels into consideration.

Figure 11A:
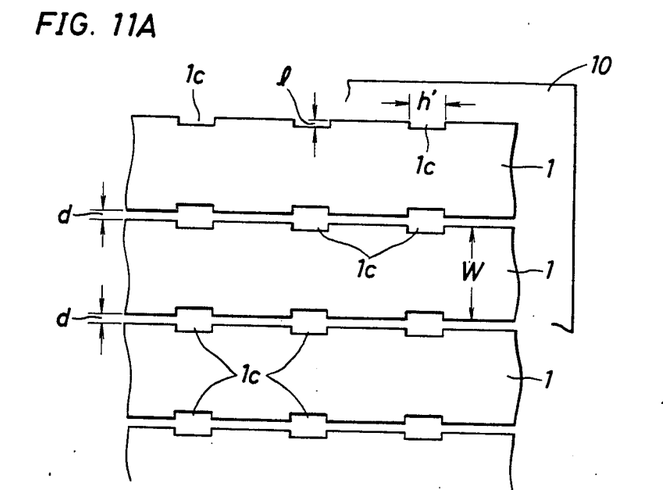
FIG. 11A is a partially enlarged view of the scanning electrodes of a liquid-crystal cell according to a third embodiment of the present invention.
Figure 11B:
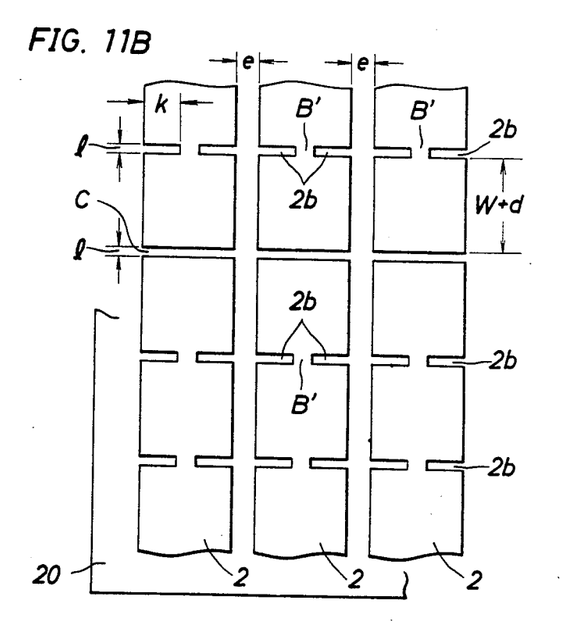
FIG. 11B is a partially enlarged view of the signal electrodes of the liquid-crystal cell according to the third embodiment of the present invention.

FIGS. 11A and 11B show the electrode shapes of a liquid-crystal cell according to a third embodiment of the present invention.

In this embodiment, as shown in FIG. 11A, notches 1c of a length h' and depth l are formed along two side edges of each scanning electrode 1 and, as shown in FIG. 11B, slits 2b of a width l and a length k are formed from the two edge portions of each signal electrode toward the central portion thereof at positions corresponding to intersections between the signal and scanning electrodes 2 and 1. Each signal electrode 2 is connected by central electrode connecting portions B' between two slits 2b. It should be noted that the depth of the notch 1c of each scanning electrode 1 and the width of the slit 2b of each signal electrode 2 are set to be equal to an inter-electrode distance l at a central portion C of the signal electrodes 2.

Figure 12:
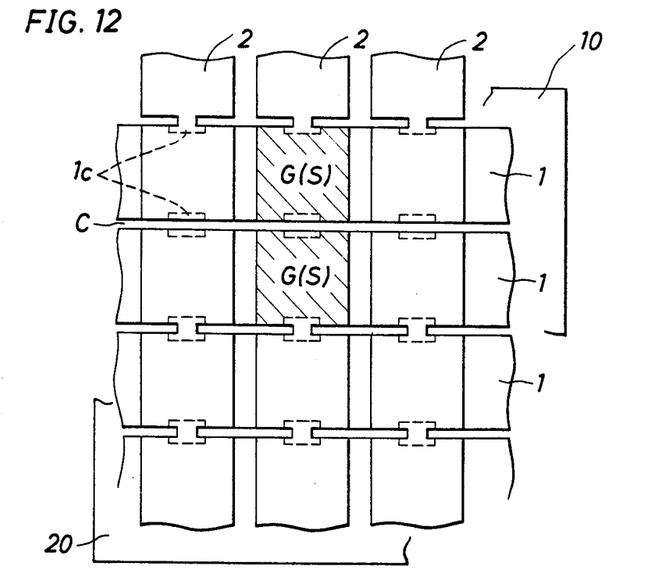
FIG. 12 is a partially enlarged view of the electrode arrangement combining the scanning electrodes shown in FIG. 11A and the signal electrodes shown in FIG. 11B.

FIG. 12 shows a state wherein the scanning and signal electrodes 1 and 2 shown in FIGS. 11A and 11B according to the third embodiment are aligned to be shifted neither in the vertical nor horizontal directions. In this state, the intersections (indicated by hatching) between the electrodes 1 and 2 serve as pixels G, and areas S of all the pixels G are equal to each other.

Figure 13:
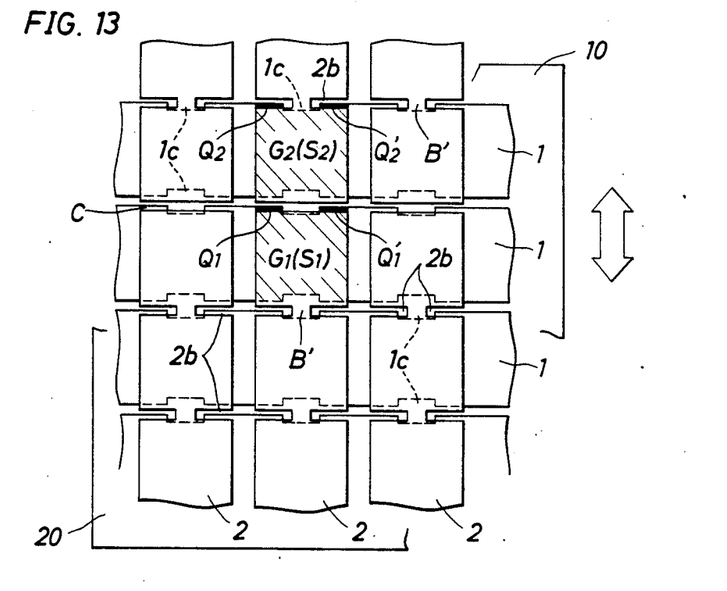
FIG. 13 is a partially enlarged view showing a state wherein one electrode group is shifted vertically from the other electrode group in the arrangement of FIG. 12.

Next, a case will be considered wherein the scanning and signal electrodes 1 and 2 are shifted vertically (indicated by the white arrow) from each other, as shown in FIG. 13, in the manufacture of the liquid-crystal cell of this embodiment. An area $S_1$ of a pixel $G_1$ influenced by the central portion C of the signal electrodes 2 is decreased by $(Q_1 + Q'_1)$ (indicated by solid bars), and an area $S_2$ of a pixel $G_2$ free from the influence of the central portion C is decreased by $(Q_2 + Q'_2)$ (indicated by solid bars). However, since $(Q_1 + Q'_1) = (Q_2 + Q'_2)$, the areas of the pixels $G_1$ and $G_2$ become equal to each other, as in the second embodiment, and no white line appears at the center of the screen. In this embodiment, the range where the central electrode connecting portion B' between the slits 2b does not fall outside the notch 1b corresponds to a tolerance for horizontal shifting.

In the above embodiments, the present invention has been exemplified using a normally white liquid-crystal cell, but can also be applied to a normally black liquid-crystal cell. Note that in the normally black liquid-crystal cell, the present invention can prevent a black line from being displayed at the center of a screen.

What is claimed is:

1. An electrode structure of a liquid-crystal cell in which a plurality of transparent stripe signal electrodes are arranged on a first transparent substrate to be separated from each other at the central portions in the longitudinal direction thereof, a plurality of transparent stripe scanning electrodes are arranged on a second transparent substrate to be substantially perpendicular to said transparent signal electrodes, and a liquid-crystal material is sandwiched between said first and second transparent substrates, wherein slits are formed in said transparent signal electrodes along the widthwise direction thereof at non-intersecting portions between said transparent signal electrodes and said transparent scanning electrodes, and wherein a plurality of notches are formed along the two side edges of each of said transparent scanning electrodes at equal intervals, and said notches correspond to electrode connecting portions adjacent to said slits of said transparent signal electrodes.

2. An electrode structure of a liquid-crystal cell according to claim 1, wherein said slits are formed at the central portions of said transparent signal electrodes along the widthwise direction thereof, so that electrode connecting portions remain at two ends of said slits along the longitudinal direction thereof.

3. An electrode structure of a liquid-crystal cell according to claim 2, wherein the length of a projection formed between two adjacent notches is smaller than that of said slit.

4. An electrode structure of a liquid-crystal cell according to claim 1, wherein said slits are formed to extend from two side edges of said transparent signal electrode toward the central portion, leaving an electrode connecting portion therebetween.

5. An electrode structure of a liquid-crystal cell according to claim 4, wherein the length of said electrode connecting portion is smaller than that of said notch formed in said transparent scanning electrode.

* * * * *